Patented May 15, 1951

2,552,567

UNITED STATES PATENT OFFICE 2,552,567

DIENOPHILIC ADDITION PRODUCTS OF KETALS OF CYCLIC CHLOROCARBON KETONES

Earl T. McBee and Jack S. Newcomer, West Lafayette, Ind., assignors to Purdue Research Foundation, West Lafayette, Ind., a corporation of Indiana No Drawing. Application October 1, 1948, Serial No. 52,408

8 Claims. (Cl. 260—342.4)

The present invention is concerned with novel addition products obtained by the reaction of ketals of perchlorocyclopentadienones with dienophilic compounds, and with a process whereby they may be produced. This application is a continuation-in-part of our application Serial 757,946, filed June 28, 1947.

The products of the aforesaid process are valuable as chemical intermediates in organic synthesis, such as in the preparation of 4,5-dichloro-benzene-1,2,3-tricarboxylic acid, a valuable resin constituent, and are useful per se as resin modifiers and reactants in the preparation of plasticizers and insecticides.

The process of the present invention includes reacting a ketal of a perchloro ketone, having a five-carbon-atom ring and a conjugated diene system of the formula:

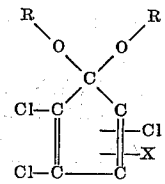

wherein R represents an alcohol residue, such as methyl, ethyl, propyl, isopropyl, butyl, cyclohexyl, glyceryl, benzyl, et cetera, and wherein X is selected from the group consisting of chlorine and trichlorovinyl, which may be prepared by the method disclosed in our co-pending application Serial 757,949, filed June 28, 1947, now Patent No. 2,493,009, with a dienophilic olefinic compound, such as maleic anhydride, diethyl or dibutyl maleates, para-benzoquinone, acrylonitrile, methylvinyl ketone, cyclopentene, and the like. A solvent which is inert to the reactants and reaction products may be employed if desired; however, this is not always necessary. The reactants and solvent, if used, may be admixed in any convenient manner. The reaction temperature may be maintained between about 50 and 200 degrees centigrade and is usually about the reflux temperature of the reaction mixture. The time to be allowed may vary from a few minutes to several hours, depending upon several factors, such as temperature, solvent, purity of the reactants, et cetera. The resulting reaction product may then be separated and purified in any conventional manner which will be apparent to one skilled in the art.

The product of the reaction is a polycyclic compound, for example, in the case of an alkyl ketal of tetrachlorocyclopentadienone with maleic anhydride, the product is 1,4,5,6-tetrachloro-7,7-dialkoxy-bicyclo(2.2.1)-5-heptene - 2,3 - dicarboxylic acid if water is present in the reaction mixture, but if water is not present, the product will be the anhydride. The anhydrides may be converted to the acids by simple recrystallization from water, while acids may be converted to anhydrides by simple heating.

The following examples are given to illustrate the practice of the present invention but are not to be construed as limiting.

*Example 1.—Reaction of maleic anhydride with tetrachloro-5,5-dimethoxycyclopentadiene*

A solution of 53 grams of tetrachloro-5,5-dimethoxycyclopentadiene, 19 grams of maleic anhydride, and 300 milliliters of xylene was refluxed for one hour and 15 minutes. After removal of the solvent by steam distillation, the resulting solid orange residue was washed repeatedly with petroleum ether and recrystallized from water to produce 62 grams of 1,4,5,6-tetrachloro-7,7-dimethoxybicyclo(2.2.1) - 5 - heptene - 2,3 - dicarboxylic acid, having a melting point of 196 to 197 degrees centigrade, a neutral equivalent of 192 (calcd. 190), and 38 percent chlorine (calcd. 37.4).

The dibasic acid (14 grams) was converted to the anhydride by heating at 220 to 225 degrees centigrade until the evolution of gases ceased. Extraction of the cooled product with benzene and subsequent recrystallization produced 8.3 grams of the anhydride, having a melting point of 192 degrees centigrade, containing 39.7 percent chlorine (calcd. 39.2), and having a neutral equivalent, in methyl alcohol, of 360 (calcd. 362).

*Example 2.—Reaction of maleic anhydride with tetrachloro-5,5-diethoxycyclopentadiene*

A solution of the ketal (14 grams), maleic anhydride (5 grams) and 100 milliliters of xylene was refluxed for one hour and 15 minutes. The product was isolated and purified as described in the preceding example to obtain 17.2 grams of 1,4,5,6-tetrachloro - 7,7 - diethoxybicyclo(2.2.1) - 5-heptene-2,3-dicarboxylic acid, having a neutral equivalent of 219 (calcd. 204).

*Example 3.—Reaction of maleic anhydride with the dimethoxy ketal of trichlorovinyltrichlorocyclopentadienone*

In a manner similar to that of Example 1, dimethoxy trichlorovinyltrichlorocyclopentadienone (19 grams), maleic anhydride (8 grams), and 120 milliliters of xylene are refluxed for one hour and 15 minutes. The product is isolated and purified as described in the preceding example to yield trichlorovinyltrichloro-7,7-diethoxybicyclo(2.2.1)-5-heptene-2,3 - dicarboxylic acid, having a neutral equivalent corresponding approximately to the theoretical of 251.

Similarly, other dialkyl ketals, e. g., the dipropyl, propylethyl, dibutyl, and diamyl ketals of tetrachlorocyclopentadienone or trichlorovinyltrichlorocyclopentadienone may be reacted with a dienophilic olefinic compound to obtain the corresponding chloro-substituted dienophilic addition product. Other ketals, e. g., wherein other alcohol residues are present in place of the dialkyl groups, as in chloro, hydroxy, amino, and otherwise substituted dialkyl ketals of tetrachlorocyclopentadienone and trichlorovinyltrichlorocyclopentadienone, may also be employed. Representative ketal groups are cyclohexanol, hexanol, octanol, dodecanol, octadecanol, benzyl alcohol, phenol, cresol, resorcinol, thymol, menthol, ethylene chlorohydrin, glycerol chlorohydrin, hydroxyacetic acid and its esters; monoalkyl ethers of ethylene glycol, diethylene glycol and higher ethylene glycols; allyl alcohol, methallyl alcohol, crotyl alcohol, et cetera.

Various modifications may be made in the method of the present invention without departing from the spirit or scope thereof, and it is to be understood that we limit ourselves only as defined in the appended claims.

We claim:

1. The process for the preparation of dienophilic addition compounds which includes: reacting a ketal of a compound selected from the group consisting of tetrachlorocyclopentadienone and trichlorovinyltrichlorocyclopentadienone with a dienophilic olefinic compound selected from the group consisting of maleic acid and maleic anhydride at a temperature between about 50 and 200 degrees centigrade.

2. The process for the preparation of dienophilic addition compounds which includes: reacting a ketal of a compound selected from the group consisting of tetrachlorocyclopentadienone and trichlorovinyltrichlorocyclopentadienone with maleic anhydride at a temperature between about 50 and 200 degrees centigrade.

3. The process for the preparation of dienophilic addition compounds which includes: reacting a dialkyl ketal of tetrachlorocyclopentadienone with a dienophilic olefinic compound at a temperature between about 50 and 200 degrees centigrade.

4. The process for the preparation of dienophilic addition compounds which includes: reacting a dialkyl ketal of tetrachlorocyclopentadienone with maleic anhydride at a temperature between about 50 and 200 degrees centigrade.

5. A compound selected from the group consisting of (a) 1,4,5,6-tetrachloro-7,7-dialkoxybicyclo(2.2.1)-5-heptene-2,3-dicarboxylic acids and (b) anhydrides thereof.

6. 1,4,5,6 - tetrachloro - 7,7-dimethoxybicyclo-(2.2.1) - 5 - heptene-2,3-dicarboxylic acid having the formula:

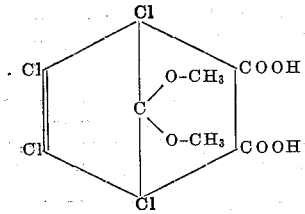

7. 1,4,5,6 - tetrachloro - 7,7-dimethoxybicyclo-(2.2.1)-5-heptene-2,3-dicarboxylic acid anhydride having the formula:

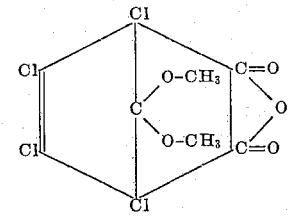

8. 1,4,5,6 - tetrachloro - 7,7 - diethoxybicyclo-(2.2.1) - 5 - heptene-2,3-dicarboxylic acid having the formula:

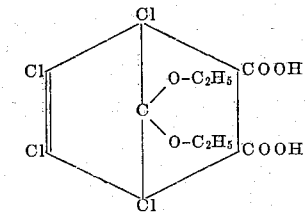

EARL T. McBEE.
JACK S. NEWCOMER.

REFERENCES CITED

The following references are of record in the file of this patent:

UNITED STATES PATENTS

| Number | Name | Date |
|---|---|---|
| 1,967,862 | Carothers et al. | July 24, 1934 |
| 2,097,854 | Dilthey | Nov. 2, 1937 |
| 2,179,809 | Bockemuller | Nov. 14, 1939 |

OTHER REFERENCES

Norton, Chemical Reviews, October 1942, pp. 394–398.

Krynitsky et al.: Journal of the American Chem. Soc., vol. 69, August 1947, pp. 1918–1920.